(12) United States Patent
Song et al.

(10) Patent No.: US 8,596,887 B2
(45) Date of Patent: Dec. 3, 2013

(54) OPTICAL FIBER FUSION SPLICER

(75) Inventors: Jae Seop Song, Daejeon (KR); Sang Chul Jun, Okcheon-gun (KR); Young Bae Seo, Jeungpyeong-gun (KR)

(73) Assignee: Ilsintech Co., Ltd., Daejeon (KR)

( * ) Notice: Subject to any disclaimer, the term of this patent is extended or adjusted under 35 U.S.C. 154(b) by 278 days.

(21) Appl. No.: 12/666,290

(22) PCT Filed: Jun. 20, 2008

(86) PCT No.: PCT/KR2008/003533
§ 371 (c)(1),
(2), (4) Date: Jun. 15, 2010

(87) PCT Pub. No.: WO2009/002054
PCT Pub. Date: Dec. 31, 2008

(65) Prior Publication Data
US 2010/0272405 A1 Oct. 28, 2010

(30) Foreign Application Priority Data

Jun. 22, 2007 (KR) .................. 10-2007-0061665
Sep. 17, 2007 (KR) .................. 10-2007-0093992

(51) Int. Cl.
*G02B 6/255* (2006.01)
*G02B 6/00* (2006.01)

(52) U.S. Cl.
USPC ............................................. 385/96; 385/135

(58) Field of Classification Search
None
See application file for complete search history.

(56) References Cited

U.S. PATENT DOCUMENTS

| 6,814,124 | B2 * | 11/2004 | Esmaeili ............... 156/502 |
| 7,212,718 | B2 * | 5/2007 | Sato ..................... 385/134 |
| 2003/0123834 | A1 * | 7/2003 | Burek et al. ............ 385/137 |
| 2005/0123253 | A1 * | 6/2005 | Sato ...................... 385/99 |
| 2006/0280417 | A1 | 12/2006 | Sato et al. |

FOREIGN PATENT DOCUMENTS

| JP | 2004-191597 | 7/2004 |
| KR | 10-1997-0038796 | 7/1997 |
| KR | 10-0143851 | 8/1998 |
| KR | 10-2007-0029702 | 3/2007 |

OTHER PUBLICATIONS

International Search Report for PCT/KR2008/003533 mailed Jan. 7, 2009.

* cited by examiner

*Primary Examiner* — Tina Wong
(74) *Attorney, Agent, or Firm* — Christopher Paul Mitchell

(57) ABSTRACT

An optical fiber fusion splicer (1) includes a body (10); a joining part (20) disposed on the top portion of the body (10) to join ends of two optical fibers (2); a heating part (30) disposed on the top portion of the body to fuse a sleeve pipe (3) to the optical fibers, which are joined to each other; a monitor (40) disposed on the top portion of the body to monitor the connection state of the optical fibers; an operating part (50) disposed in the body to operate the joining part, the heating part (30) and the monitor (40); and a fixing part (60) detachably disposed on the top surface of the body so as to be positioned on one portion of the joining part. The sleeve pipe (3), which will be fused to the optical fibers (2), is fitted on the fixing part (60).

2 Claims, 9 Drawing Sheets

OPTICAL FIBER FUSION SPLICER

RELATED APPLICATIONS

This application is a 371 application of International Application No. PCT/KR2008/003533, filed Jun. 20, 2008, which in turn claims priority from Korean Patent Application Nos. 10-2007-0061665, filed Jun. 22, 2007, and 10-2007-0093992, filed Sep. 17, 2007, all of which are incorporated herein by reference in their entireties.

TECHNICAL FIELD

The present invention relates to an optical fusion splicer, and more particularly, to an optical fusion splicer enabling to safely protect a monitor for monitoring the connection state of optical fibers from exterior circumstance and to reduce time required for connecting the optical fibers and costs required for manufacturing a heating part.

BACKGROUND ART

Fusion splicers are apparatuses designed to connect two optical fibers, and there are a fusion splicing type using a pigtail and a mechanical splicing type. One example of such fusion splicers is shown in FIG. 1.

As shown in FIG. 1, a conventional optical fiber fusion splicer 1 includes a main body 10, a connecting part 20, a heating part 30, a monitor 40 and an operating part 50.

The main body 10 is for installing other parts thereon, and it is installed with a handle 11 on a predetermined outside thereof to give convenience of carriage of the fusion splicer 1.

The connecting part 20 is for connecting ends of two optical fibers from each other, and it is installed on the top surface of the body 10.

The heating part 30 is for fusing a sleeve pipe onto the connected optical fibers by giving heat, and it is installed on the top surface of the main body 10 to be disposed front of the connecting part 20. The heating part 30 is provided with a heating housing therein, the heating housing for covering the optical fibers with the sleeve pipe and for heating them, and recently, US Patent Application Publication No. 20060280417A1 discloses a splicer using two heating housings.

The monitor 40 is for monitoring the interior state of the connecting part 20, that is, the connection state of the optical fiber ends, and it is installed on the top surface of the main body 10 to be disposed behind of the connecting part 20. The monitor 40 is rotatable with respect to the main body 10 toward the direction of the arrow.

The operating part 50 is for operating the connecting part 20, the heating part 30 and the monitor 40, and it is installed on the top surface of the main body 10 to be disposed between the connecting part 20 and the monitor 40.

In addition, the main body 10 is provided with a plurality of ports such as a Universal Serial Bus (USB) port, a power port and a video port on the outside thereof, and also provided with a battery for supplying power required for operating the connecting part 20, the heating part 30 and the monitor 40 in the inside thereof.

The fusion splicer 1 having the above described construction has a problem in that the monitor 40 would be easily damaged during its movement and/or storage and a display screen 41 would be spoiled by foreign bodies since the monitor 40 is exposed outside of the main body 10.

Furthermore, the conventional fusion splicer requires lots of working time since one sleeve pipe is fused in one heater housing. Particularly, US Patent Application Publication No. 20060280417A1 uses two heating housings, thereby occupying a large space and increasing the manufacturing costs of the fusion splicer. In practice, while about 7 seconds are consumed to strip, clean or cut the optical fibers and then about 10 seconds are consumed to connect the optical fibers from each other, whereas about 45 to 60 seconds are consumed to fuse the sleeve pipe. Consequently, the whole working time is greatly increased because of insufficiency of the heating housings.

DISCLOSURE

Technical Problem

The present invention has been created to solve the foregoing problems of the prior art, and therefore an object of the present invention is to provide an optical fiber fusion splicer enabling to prevent a monitor from being broken and/or damaged during its movement and/or storage.

Another object of the present invention is to provide an optical fiber fusion splicer enabling to greatly reduce the time required for fusing a sleeve pipe onto optical fibers, costs required in manufacturing the splicer, and the splicer's size.

Technical Solution

According to an aspect of the present invention for realizing the objects, a monitor is slidably installed in a main body to be exposable during only operation.

Furthermore, more than two heating plates are provided in a housing of a heating part, the housing being used to fuse the sleeve pipe.

Advantageous Effects

According to an optical fiber fusion splicer of the present invention, a monitor can be prevented from being broken and/or damaged since it is exposed to the outside only during operation but it is placed in the main body during the splicer's movement and/or storage.

Furthermore, according to the present invention, time required for fusing the sleeve pipe onto optical fibers and costs required for manufacturing the fusion splicer can be reduced and usage of splicer can be convenient since more than two receiving spaces are provided in a housing of a heating part.

BEST MODE

Figure 1:
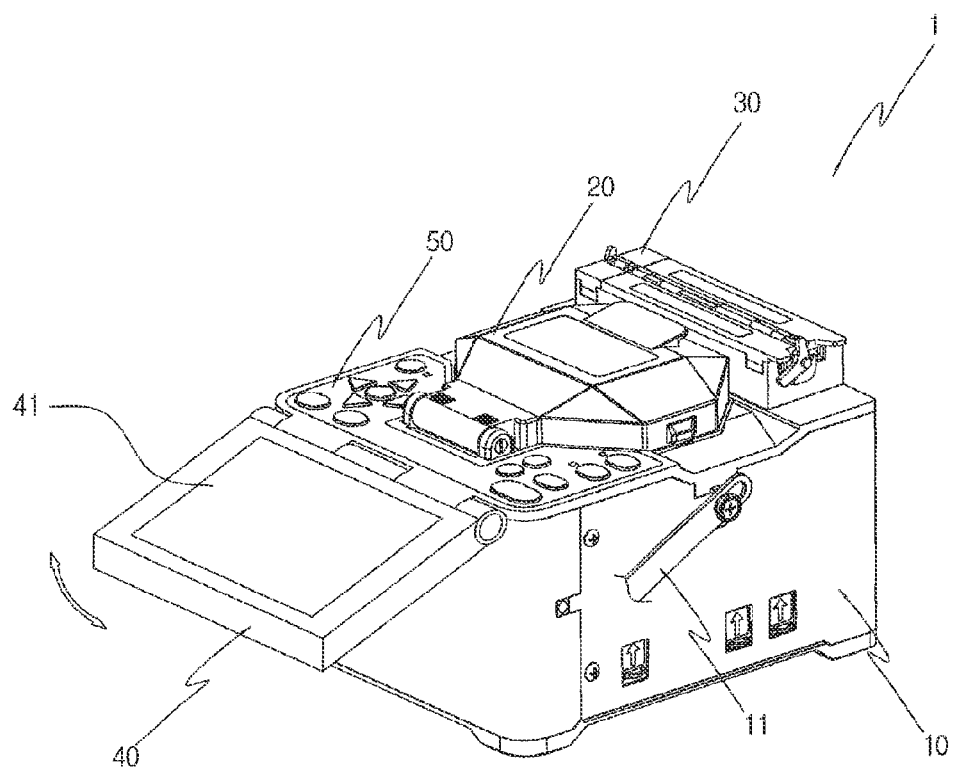
FIG. 1 is a schematic perspective view illustrating an optical fiber fusion splicer of the related art.

In order to realize the object of the present invention as mentioned above, there is provided an optical fiber fusion splicer. The fusion splicer includes a main body; a connecting part disposed on the top surface of the main body to connect ends of two optical fibers; a heating part disposed on the top portion of the main body to fuse a sleeve pipe to the optical fibers which are connected from each other; a monitor disposed on the top surface of the main body to monitor the connection state of the optical fibers; an operating part disposed in the body to operate the connecting part, the heating part and the monitor; and a holding part detachably disposed on the top surface of the main body so as to be positioned on one portion of the connecting part, wherein the sleeve pipe, which will be fused to the optical fibers, is fitted on the holding part.

In a preferred embodiment of the present invention, the heating part may include a housing, which is disposed in the main body and receives the optical fibers and the sleeve pipe, and a heating plate for heating the sleeve pipe.

Here, the heating plate may have an L- or U-shaped cross section so as to radiate heat to the bottom and side surfaces. In the heating plate having a U-shaped cross section, a receiving space can be divided into at least two sections by at least one heating partition or one general partition in order to receive at least two pairs of the optical fibers, each pair of the optical fibers connected to each other.

Two heating plates can be arranged in a sharply inclined V shape, in which both the top and bottom portions thereof are open. At least one heating partition or at least one general partition can be provided in order to receive the at least two optical fibers, which are connected to each other, and an air blower for forcibly blowing air to an opening can be provided in the bottom portion.

Alternatively, a plurality of the heating plates can be arranged in a sharply inclined V shape, and an air blower for forcibly blowing air to an opening can be provided in the bottom portion of the heating plates.

In a preferred embodiment of the present invention, the monitor can include a guide, which is arranged vertically to one portion of the main body, and locking members. The locking members can be rotatably coupled by a guide block, which slides with respect to the guide, and a hinge shaft.

Here, the guide may be provided with a guide groove, which is elongated in a length direction, wherein the guide block is fitted into the guide groove so as to slide therein.

In a preferred embodiment of the present invention, the sleeve pipe holding die may be provided with an insert protrusion, which is fitted into an insert recess of the main body.

Here, the holding part may be provided with a mounting groove on the top surface thereof, by which the sleeve pipe will be held on the holding part.

In a preferred embodiment of the present invention, a battery remaining indicator may further be provided so as to be exposed to the outside. The battery remaining indicator acts to indicate the remaining battery level for the battery used to power the connecting part, the heating part, the monitor and the operating part.

Here, the battery remaining indicator may include a level meter gauge for displaying the remaining battery, wherein a switch for the level meter gauge allows the level meter gauge to indicate the remaining battery.

[Mode for Invention]

Hereinafter, an optical fiber fusion splicer of the present invention will be described more fully hereinafter with reference to the accompanying drawings, in which preferred embodiments thereof are shown.

Figure 2:
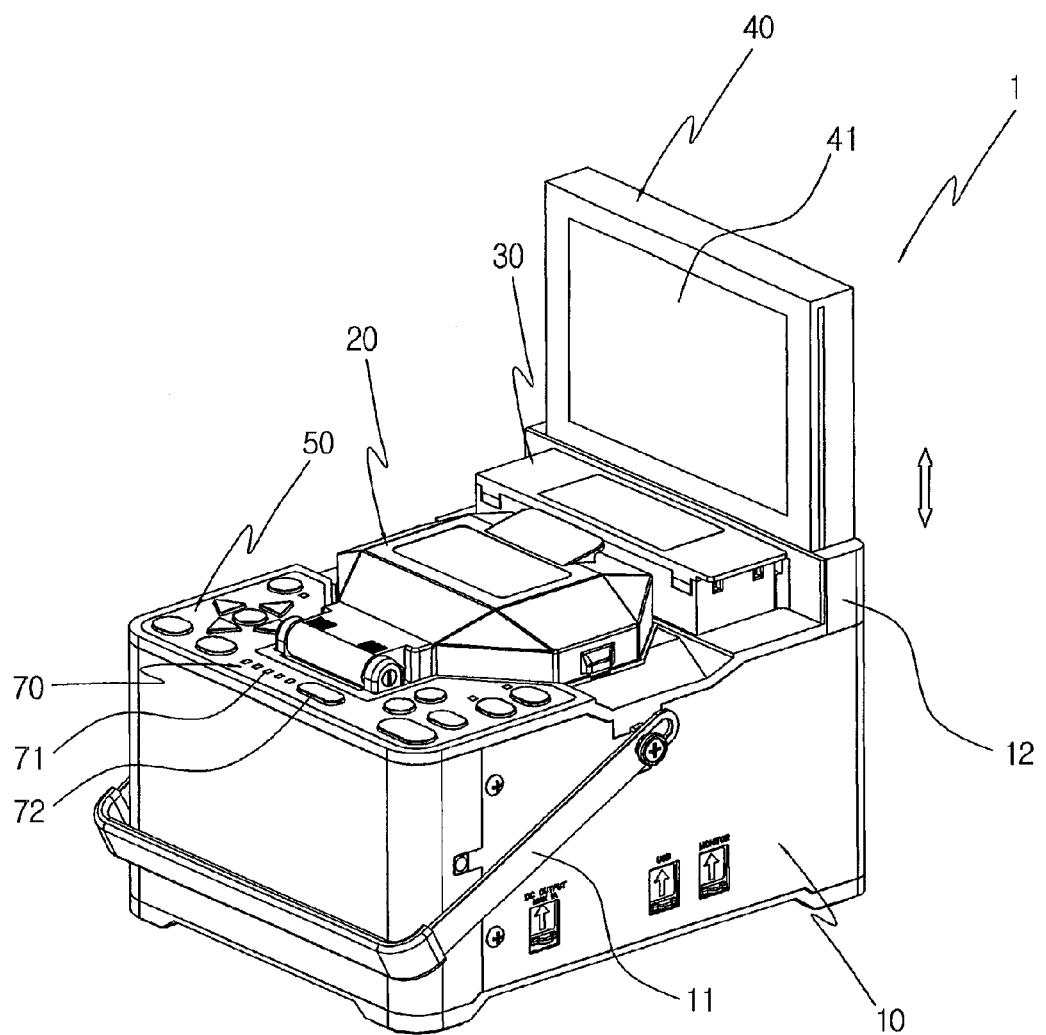
FIG. 2 is a schematic perspective view illustrating an optical fiber fusion splicer according to a preferred embodiment of the present invention.

As shown in FIG. 2, a fusion splicer 1 according to an embodiment of the present invention includes a main body 10, a connecting part 20, a heating part 30, a monitor 40, an operating part 50, a holding part 60 and a battery remaining indicator 70.

The main body 10 is for installing other parts thereon, and it is installed with a handle 11 on an outer surface thereof to give convenience of carriage of the fusion splicer 1.

The connecting part 20 is for connecting ends of two optical fibers from each other, and it is installed on the top surface of the main body 10.

Although not illustrated in detail, the connecting part 20 includes a fixing cover for fixing optical fibers, a rod electrode for welding the optical fibers, an object lens, an illumination lamp, and a windshield cover and so on. The connecting part 20 fixes two optical fibers, in which opposite ends thereof are stripped, cleaned and cut, using the fixing cover, and welds the ends of the optical fibers using the rod electrode, thereby connecting the ends of the optical fibers.

The heating part 30 is for fusing a sleeve pipe onto the connected optical fibers by giving heat, and it is installed on the top surface of the main body 10 to be disposed front of the connecting part 20.

Figure 3:
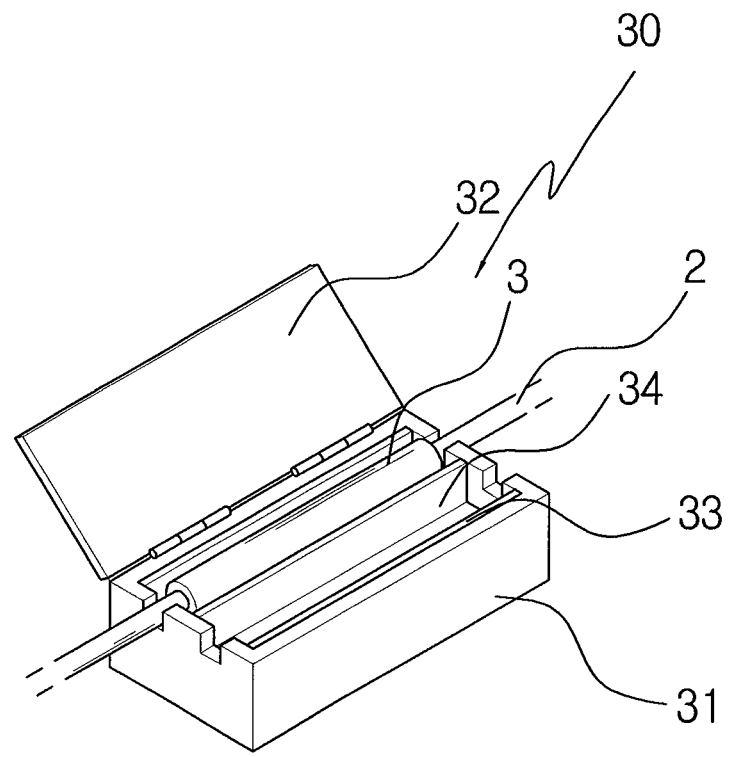
FIG. 3 is a schematic perspective view illustrating the heating part shown in FIG. 2.
Figure 4:
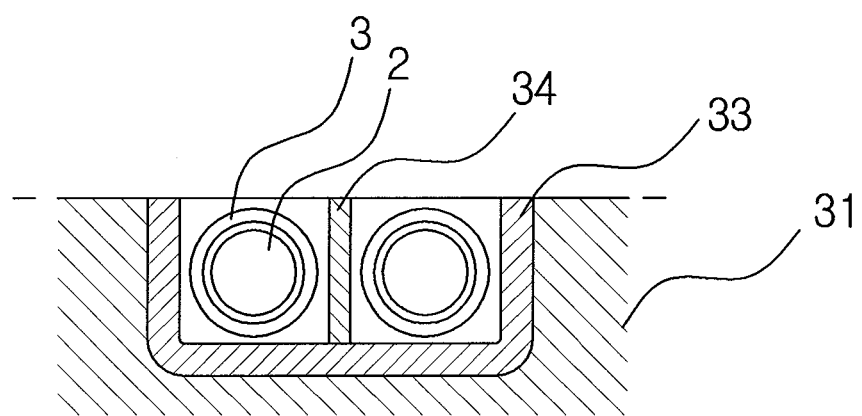
FIG. 4 is a schematic cross-sectional view illustrating the heating part shown in FIG. 3.

As specifically shown in FIGS. 3 and 4, the heating part 30 includes a housing 31, a cover 32, a heating plate 33 and a heating partition 34.

The housing 31 is fixedly or detachably disposed on the top surface of the main body 10, and it serves to receive optical fibers 2 and a sleeve pipe 3 therein.

The cover 32 is hinged to the housing 31, and it is provided with a transparent window (not shown) so that the inside of the housing 31 can be seen.

The heating plate 33 is disposed inside the housing 31, and it is powered by a battery to radiate heat. The heating plate 33 can preferably have an L- or U-shaped cross section so as to radiate heat even through the side walls thereof. In this embodiment, the heating plate 33 is implemented with a ceramic heater.

The heating partition 34 divides the inside of the heating plate 33 into two sections in such a manner that two pairs of the optical fibers 2 are arranged at a predetermined interval from each other, in which the optical fibers 2 with the opposite ends butted against each other are connected by the sleeve pipe 3. While one or more of the heating partition 34 can be provided according to the number of the pairs of the optical fibers 2, this embodiment employs one heating partition 34 so that two pairs of the optical fibers 2 can be arranged inside the heating part 30.

In the case where one or more of the heating partitions 34 are disposed, the heating plate 33 can preferably have a U-shaped cross section. This configuration provides a simple structure and also it allows heat to radiate through the bottom and the side walls so that the heating part 30 can respond quickly.

Figure 5:
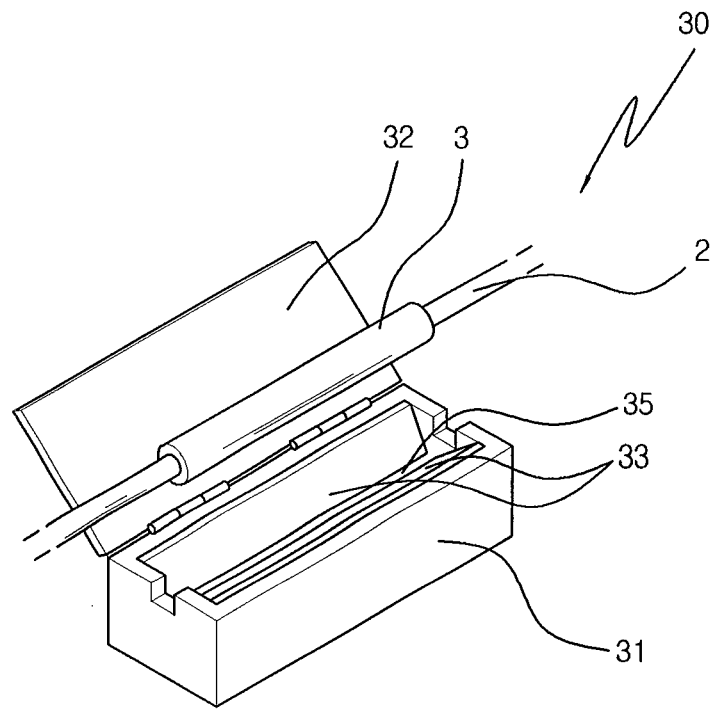
FIG. 5 is a schematic perspective view illustrating an alternative configuration of the heating part shown in FIG. 2.
Figure 6:
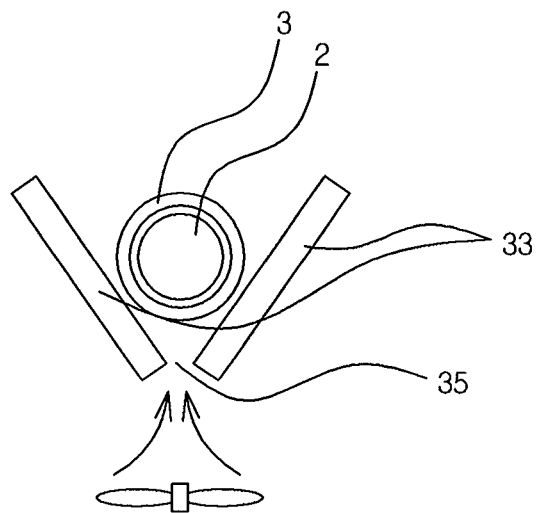
FIG. 6 is a schematic side elevational view illustrating an arrangement of the heating plates shown in FIG. 5.

Alternatively, the heating part 30 can be modified into a construction as shown in FIGS. 5 and 6.

As specifically shown in FIGS. 5 and 6, the heating part 30 includes a housing 31, a cover 32 and heating plates 33. The housing 31 and the cover 32 are the same as those shown in FIG. 3 and thus will not be described repeatedly herein.

Two the heating plates 33 are arranged in a "V" shape or a "\|/" shape, in which both the top and bottom surfaces thereof are open. To cool down the sleeve pipe 3 and the optical fibers 2 heated, air (cold air) is forcibly blown from an air blower under the heating plates 33 through an opening 35 formed between the bottom ends of the heating plates 33.

With this construction, the sleeve pipe 3 can be easily heated by heating from below and also be uniformly cooled down by air forcibly blown through the openings 35, which are provided in the bottom surfaces of the heating plates 33, since the two heating plates 33 are arranged in a "V" shape, and since the air blower is placed under the heating plates 33.

Figure 7:
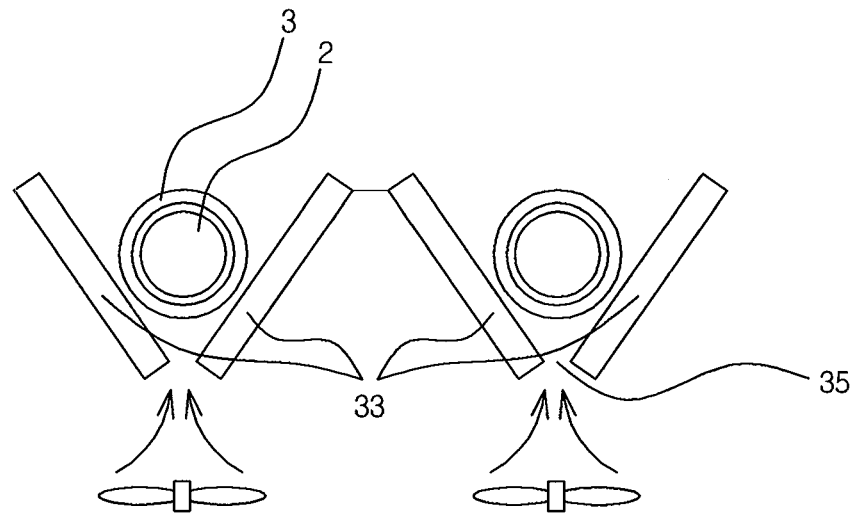
FIG. 7 is a schematic side elevational view illustrating an alternative arrangement of the heating plates shown in FIG. 6.

Further, as shown in FIG. 7, two or more pairs of the two heating plates 33, arranged in a "V" shape, can be arrayed parallel to each other. In the case where plural pairs of the two heating plates 33 are provided as above, respective heating plates 33 can preferably be supplied with different amounts of current to vary the heating rates thereof.

Figure 8:
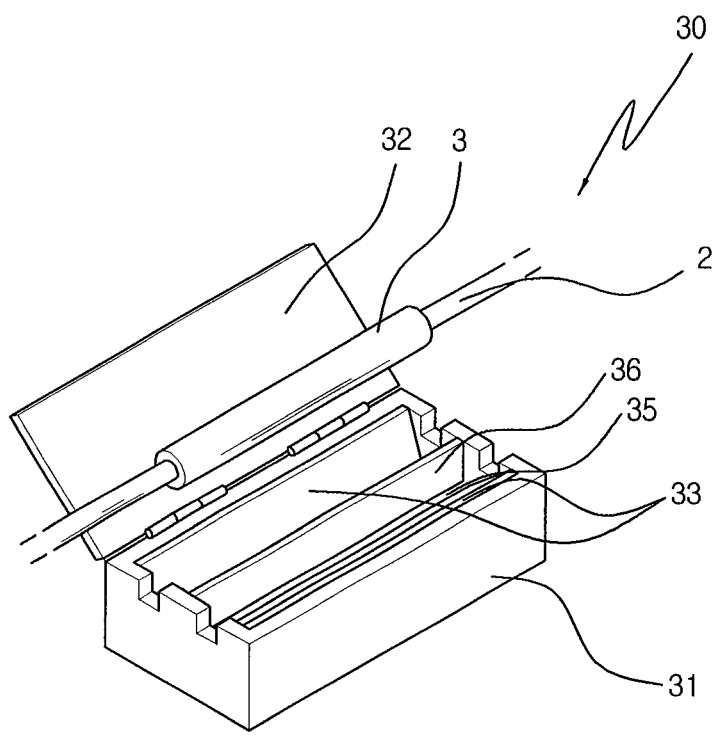
FIG. 8 is a schematic perspective view illustrating an alternative configuration of the heating part shown in FIG. 2.
Figure 9:
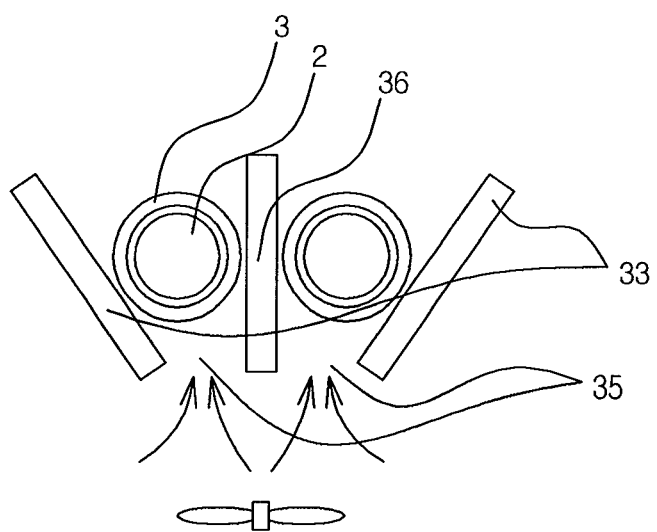
FIG. 9 is a schematic side elevational view illustrating an arrangement of the heating plates shown in FIG. 8.

Alternatively, as shown in FIGS. 8 and 9, the construction of the heating part 30 can be modified.

As specifically shown in FIGS. 8 and 9, the heating part 30 includes a housing 31, a cover 32 and heating plates 33. The housing 31 and the cover 32 are the same as those shown in FIG. 3 and thus will not be described repeatedly herein.

The heating plates 30 are arranged in a slightly different configuration from that shown in FIG. 5.

Specifically, two of the heating plates 33, arranged in a "V" shape, are spaced apart from each other by a predetermined distance, and one vertical heating plate 36 is arranged between the two inclined heating plates 33. With this construction, two pairs of optical fibers 2 and a sleeve pipe 3 can be simultaneously welded and/or cooled down.

The monitor 40 is for monitoring the interior state of the connecting part 20, that is, the connection state of the ends of optical fibers, and it is disposed on the top surface of the main body 10 to be disposed behind the connecting part 20. The monitor 40 is slidable along a guide (12 in FIG. 11) in the direction of an arrow shown in FIG. 2 so as to move into and out of the main body 10, and it is rotatable with respect to the guide 12, in the direction of an arrow as shown in FIG. 10.

Figure 10:
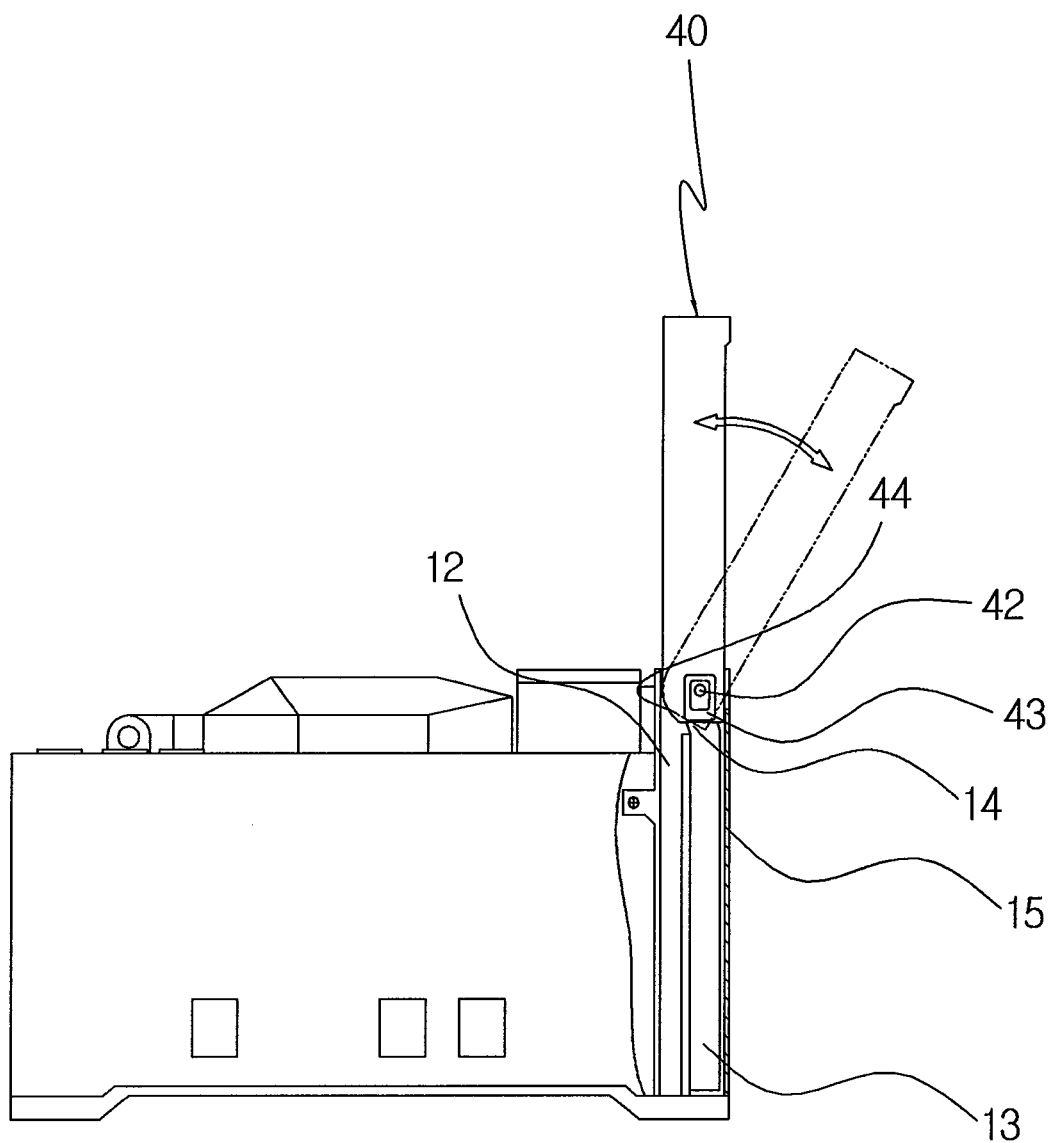
FIG. 10 is a schematic side elevational view illustrating the fusion splicer shown in FIG. 2.
Figure 11:
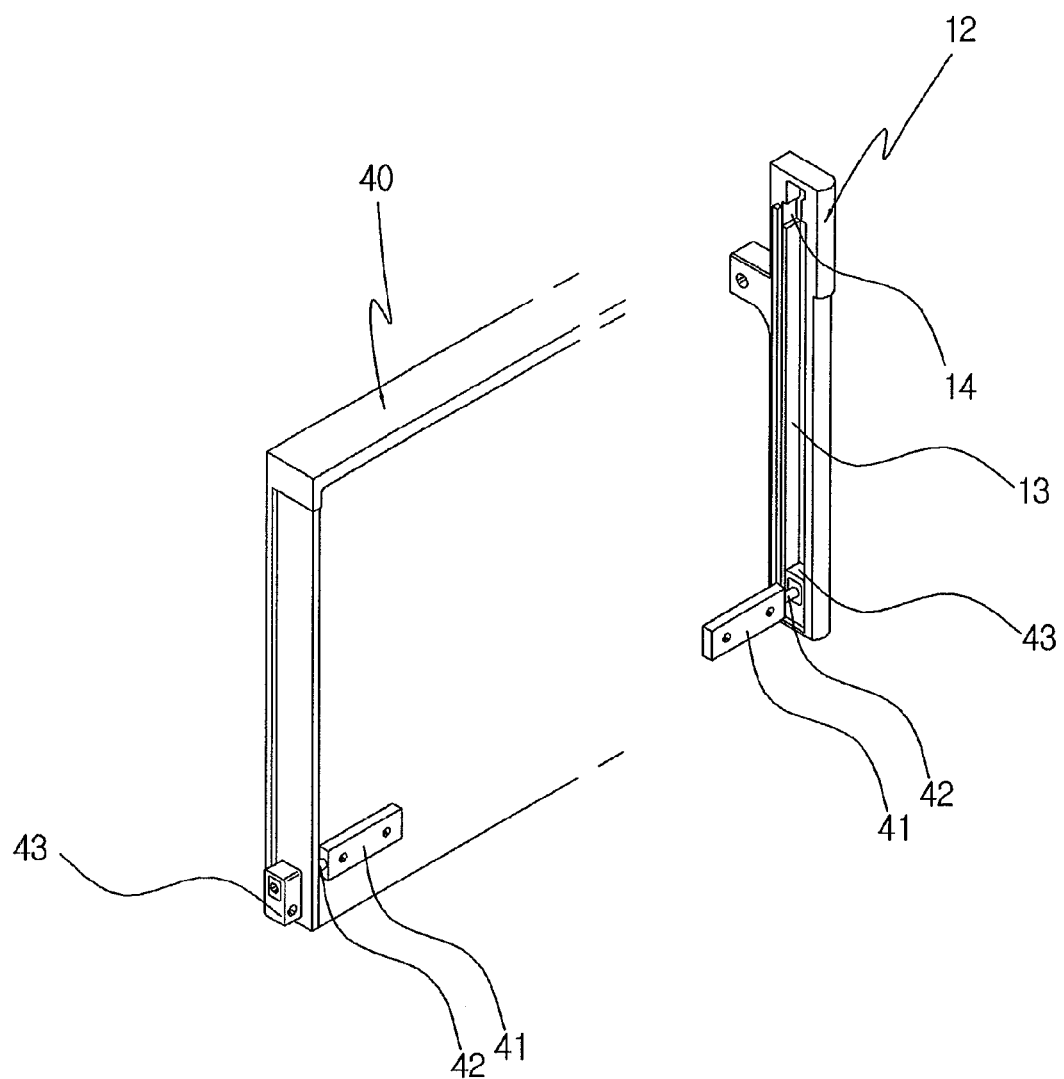
FIG. 11 is an exploded perspective view illustrating parts of the monitor shown in FIG. 10.

For this purpose, as shown in FIGS. 10 and 11, the monitor 40 is provided with a rounded portion 44 at the bottom portion thereof and locking members 41 on both sides of the bottom portion. Each of the locking members 41 has a hinge shaft 42.

The hinge shaft 42 is rotatably coupled with a guide block 43, which is fitted into a guide groove 13 of the guide 12. The guide block 43 can be preferably constructed to be rotated by only an external force, and after having been rotated to a predetermined angle, remain at the rotated angle, so that the monitor 40 can remain at the rotated angle.

The guide 12 is provided with a protective plate 15 for protecting the monitor 40. The protective plate 15 can preferably be provided in a position that does not obstruct the rotation of the monitor 40.

In addition, a protrusion/recess 14 can be formed in the top portion of the guide groove 13 so that the monitor 40 can be fixed to an outwardly exposed position after the sliding of the monitor 40 is completed. The monitor 40 is fixed to the corresponding position as the guide block 43 moving along the guide groove 13 is seated in the protrusion/recess 14.

The operating part 50 is for operating the connecting part 20, the heating part 30 and the monitor 40, and it is disposed on the top surface of the main body 10 to be disposed between the connecting part 20 and the monitor 40.

In addition, the main body 10 is provided, on the exterior thereof, with a plurality of ports, such as a Universal Serial Bus (USB) port, a power port and a video port. A battery, which supplies power necessary for the operation of the connecting part 20, the heating part 30 and the monitor 40, is provided in the main body 10. The battery is implemented as a rechargeable battery, which is commonly used in electronic appliances.

Figure 12:
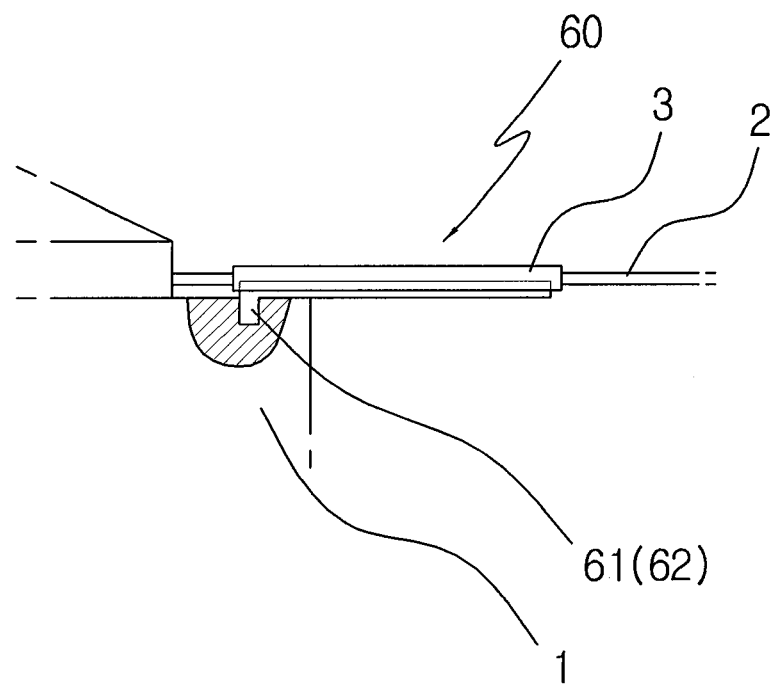
FIG. 12 is a schematic view illustrating a fixing part shown in FIG. 2.

The holding die 60 is for guiding the sleeve pipe 3 held thereon to the connecting part 20, where the sleeve pipe 3 will be fused to optical fibers. The holding die 60 is detachably disposed on the top surface of the main body 10 so as to be positioned on one portion of the connecting part 20. For this purpose, as more specifically shown in FIG. 12, the holding die 60 is formed with an insert protrusion 61 on one end thereof, and the main body 10 is formed with an insert recess 62 in the top surface thereof, into which the insert protrusion 61 is fitted.

The holding die 60 is also provided with a mounting groove 63 on the top surface thereof, by which the sleeve pipe 3 can be fitted on the holding die 60.

The battery remaining indicator 70 is for indicating a remaining battery, and it is provided with a level meter gauge 71 in such a manner that an operator can easily recognize in real-time the remaining battery. Here, a switch 62 for the level meter gauge allows the level meter gauge 71 to indicate the remaining battery. That is, the switch 62 is turned on/off so that the remaining battery can be displayed on the level meter gauge 71. When the operator checks the remaining battery, the charging time of a rechargeable battery or the replacing time of a disposable battery can be easily recognized.

While the optical fiber fusion splicer of the present invention has been described with reference to the particular preferred embodiments, it will be apparent to those skilled in the art that various modifications, changes or variations can be made without departing from the scope of the present invention.

INDUSTRIAL APPLICABILITY

The optical fiber fusion splicer of the present invention can be readily carried and easily used by an operator in a house, an office or various working sites, in which optical fibers are required to be connected.

The invention claimed is:

1. An optical fiber fusion splicer, the splicer comprising:
   a connecting part for connecting two optical fibers from each other;
   a heating part for fusing a sleeve pipe which protects the connected two optical fibers;
   a monitor for monitoring the connection state;
   a battery for operating the connecting part, the heating part and the monitor; and
   a main body on which the connecting part, the heating part, the monitor and the battery are mounted, wherein
   the heating part includes one housing having more than two receiving spaces divided from each other so that each sleeve pipe and each optical fiber are fused in each receiving space, and
   the receiving space is divided to have a "\|/" shape.

2. An optical fiber fusion splicer, the splicer comprising:
   a connecting part for connecting two optical fibers from each other;

a heating part for fusing a sleeve pipe which protects the connected two optical fibers;
a monitor for monitoring the connection state;
a battery for operating the connecting part, the heating part and the monitor; and
a main body on which the connecting part, the heating part, the monitor and the battery are mounted, wherein
the heating part includes one housing applied with more than two heating plates therein, and
the heating plates are arranged to have a "\/" shape or a "\|/" shape.

* * * * *